June 27, 1950 K. A. BEIER 2,512,735
VIBRATION DAMPENER
Filed Aug. 17, 1945 2 Sheets-Sheet 1

INVENTOR.
KURT A. BEIER.
BY
Lockwood, Goldsmith & Galt.
ATTORNEYS.

June 27, 1950     K. A. BEIER     2,512,735
VIBRATION DAMPENER

Filed Aug. 17, 1945     2 Sheets-Sheet 2

INVENTOR.
KURT A. BEIER.

BY
Lockwood, Goldsmith & Galt.
ATTORNEYS.

Patented June 27, 1950

2,512,735

UNITED STATES PATENT OFFICE 2,512,735

VIBRATION DAMPENER

Kurt A. Beier, Indianapolis, Ind., assignor to Schwitzer-Cummins Company, Indianapolis, Ind., a corporation Application August 17, 1945, Serial No. 610,896

5 Claims. (Cl. 74—574)

This invention relates to a vibration dampener particularly applicable for dampening out vibrations set up in a rotating machine part, such as the crank shaft of internal combustion engines or other structures involving variable speed torsional deflections ranging from a low speed to a relatively high speed.

It has heretofore been common practice to apply a vibration dampener to a rotating machine part such as a crank shaft subjected to variable torque through the attached connecting rods. As an elastic body, the crank shaft has a natural torsional vibration frequency. At certain engine speeds the frequency of the torque variations imparted to the crank shaft by the connecting rods may be in synchronization with the natural frequency of the crank shaft, and when this occurs, objectionable and even dangerous torsional deflections of the crank shaft may be built up unless such deflections are effectively dampened.

In many cases it has been sought to solve the problem by various forms of inertia units mounted on the forward end of the crank shaft. One of the commonest types of such units involves frictional resistance between the shaft and the inertia unit, through the medium of an interposed friction element, such as brake lining or a friction disk to frictionally resist torsional deflection. Another form of dampener comprises that type which yieldingly resists torsional deflection through the medium of a rubber lining or cushion interposed between the shaft and the inertia element.

Many machine parts, such as the multi-cylinder engine crank shafts, have a number of natural modes of vibration and will vibrate in resonance with several different applied torque frequencies. In order to obtain low stresses over the entire range of official frequencies, it is necessary to have the right combination of inertia, torsional elasticity, and friction in the dampener.

It is, therefore, the purpose of this invention to provide a dampener unit designed to produce a maximum reduction of these natural modes of vibration by the combined action of the inertia, torsional elasticity, and frictional resistance. This is accomplished by providing a friction disk in association with a rubber element acting to provide a compressive force to vary the frictional resistance, and also a yielding spring-like torsional resistance. The rubber element therefore, acts as a torsional spring to provide contact pressure on the friction surface.

The full nature of the invention will be understood from the accompanying drawings and the following description and claims:

Figure 1:
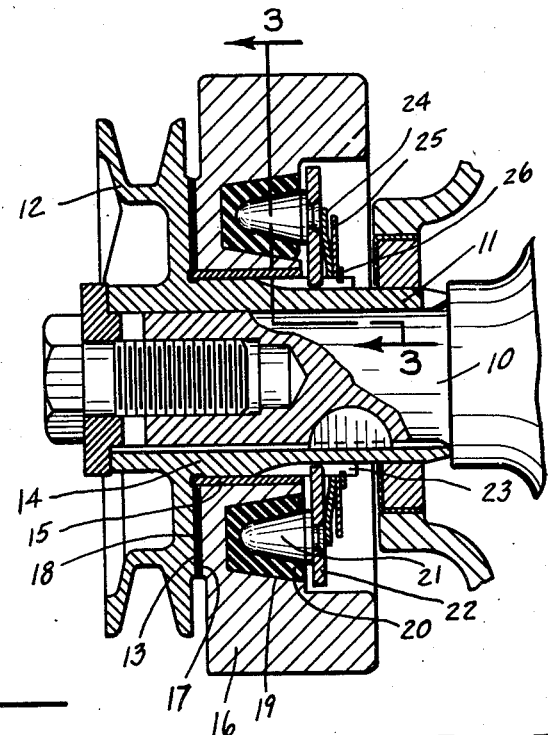
Fig. 1 is a central vertical section through the vibration dampener as applied to an engine crank shaft.
Figure 2:
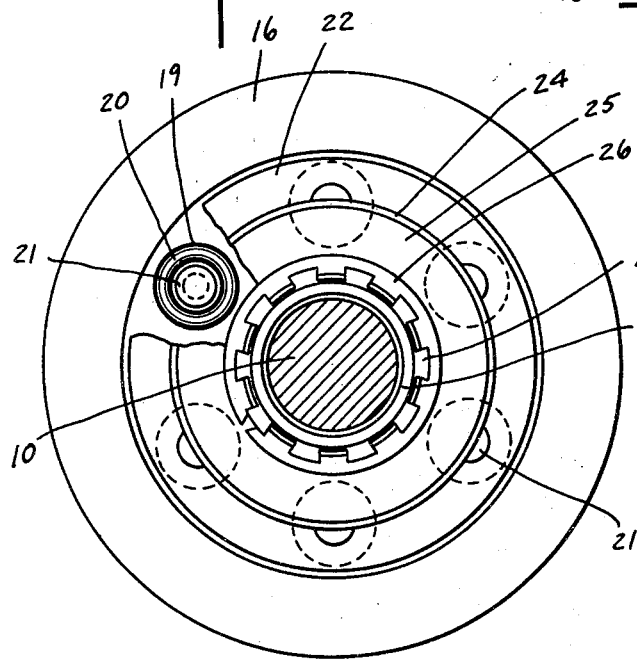
Fig. 2 is an end elevation thereof with parts removed and broken away.
Figure 3:
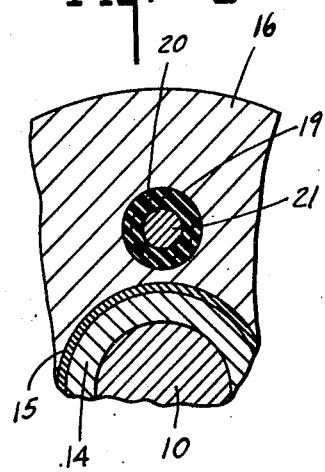
Fig. 3 is a section taken on the line 3—3 of Fig. 1.

In the drawings there is shown a vibration dampener unit mounted on the end of a rotating crank shaft 10 and secured for rotation therewith. Said unit comprises an elongated sleeve 11 which may, as herein shown, carry a pulley 12 through which a cooling fan may be driven in the usual and well known manner. The pulley 12 or any flanged portion of the sleeve 11 is provided with a friction face 13 which is integral or is secured to rotate with the sleeve 11. The pulley or friction surface 13 lies adjacent the hub portion of the sleeve 11, indicated at 14.

The hub portion 14 is provided with a surrounding bushing 15 which rotatably supports thereon an inertia element 16. Said inertia element may be in the form of a small flywheel, as herein shown, or any other element accessory to the engine. Said inertia element is of sufficient body to comprise substantial weight such as to counteract and dampen the vibrations. Said element is provided with a friction surface indicated at 17 mating with the friction surface 13 and between which there is provided a friction disk 18. Said disk may be of any suitable friction material, such as commonly employed in brake lining.

Spaced about the inertia element 16 in angular relation and opposed to the surface 17, there is a plurality of cup-like cavities 19 preferably formed with outwardly tapered walls to receive a rubber plug or thimble 20 which is centrally recessed through a limited portion of its depth.

Each of such resilient thimbles is adapted to receive a correspondingly shaped tapered stud 21 such that it is in effect embedded within the resilient thimble and sufficiently spaced from the cavities 19 thereby so as to permit of substantial relative movement through the compression of the thimble. Said studs 21 are rigidly secured in annular spaced relation about the inner surface of a rigid driving plate 22 interlocked with the hub 14 for rotation therewith while permitting relative movement longitudinally through interengagement with the keyways 23. The studs 21 are maintained in imbedded relation to the yielding rubber thimbles 20 under spring tension by the spring disk 24 which is dished to bear about its periphery against the driving plate 22. Said spring disk is backed up under tension by a retaining plate 25 which in turn is locked in place by the locking ring 26 having interlocking engagement with the keyways 23.

With the above construction of vibration dampener the hub 14 and pulley 12 with its friction face 18 and the driving plate 22 carrying the studs 21 rotate with the shaft 10. The inertia element 16 of substantial weight has driving connection with the shaft and hub through the friction disk 17 and the yielding rubber thimbles 20.

Figure 4:
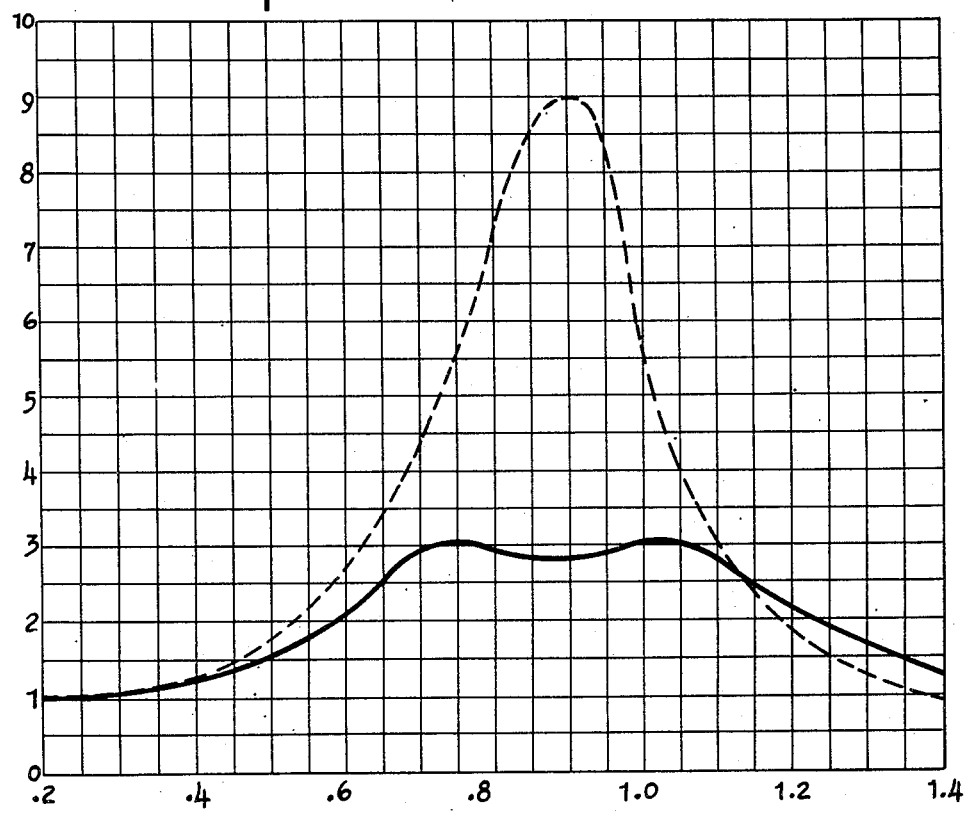
Fig. 4 is a plot of comparative curves illustrating the performance characteristics of vibration dampener.

As indicated in the plot of Fig. 4, the left-hand vertical figures represent the ratio of actual stress to the stress produced by a static torque of the same amplitude as the applied dynamic torque. The lower horizontal figures represent the ratio of applied torque frequency to the natural frequency. For these illustrative curves, the ratio of the moment of inertia of the dampener weight to the moment of inertia of the vibrating mass is 0.25. However, other ratios may be used. The dotted line curve is illustrative of the action wherein a friction dampener is employed. The full line curve is illustrative of the action wherein a dampener of this invention is employed.

The stresses at the resonant frequency (1.0 on the horizontal scale) become infinitely large when no dampening is present. The torsional stiffness of the rubber element, the size of the inertia element, and the total amount of friction all must be properly proportioned to obtain the optimum reduction of stresses at and near the resonant speed. If no friction is used, the inertia and rubber elements can be portioned so that the stresses produced by the pulsating torque will be nearly zero at a frequency near the resonant frequency of the shaft.

However, if no friction is used there will be two other frequencies at which the stresses will become very large. The frequency where the stresses in the shaft become zero is the resonant frequency for the inertia element and rubber element. At this frequency the inertia element vibrates in such a manner that it sets up forces that cancel the pulsating forces produced by the applied torque.

Many machine parts or shafts, such as multi-cylinder engine crank shafts, have a number of natural modes of vibration and will vibrate in resonance with several different applied torque frequencies. A dampener of this invention may be readily designed to provide maximum dampening for any one of these natural modes of vibration and will damp to a lesser extent the other modes of vibration.

The invention claimed is:

1. A vibration dampener comprising a hub member having a radially extending friction face and a cylindrical bearing portion, an inertia element rotatably mounted on said bearing portion having a friction face complementary to and in frictional engagement with the friction face of said hub member, a driving plate slidably keyed on said hub member to rotate therewith, said plate having an annular series of spaced projections extending into mating cavities provided in said inertia element, a resilient rubber element interposed between each of said projections and the walls of said cavities, and a spring pressure plate mounted on said hub to bear against said driving plate under spring tension.

2. A vibration dampener comprising a hub member, an inertia element rotatable relative to said hub member in frictional engagement therewith, a driving plate slidably keyed on said hub member to rotate therewith, said plate having an annular series of spaced projections extending into mating cavities provided in said inertia element, a resilient rubber thimble interposed between each of said projections and the walls of said cavities, and a spring pressure plate mounted on said hub to bear against said driving plate under spring tension.

3. A vibration dampener comprising a driving member and a driven member, said driven member including an inertia element, means for frictionally interengaging said members, a yielding driving connection between said members, and a spring for maintaining said frictional interengagement under pressure exerted through said yielding driving connection.

4. A vibration dampener comprising a driving member and a driven member, said driven member including an inertia element, each of said members having interengaging friction surfaces through which said driven member is frictionally driven by said driving member, said inertia element being provided with an annular series of spaced cavities, a yielding rubber member in each of said cavities, a mating series of projections carried by said driving member extending into and embraced by said rubber members respectively, and a spring carried by said driving member extending into engagement with said projections for maintaining said members in frictional contact under spring tension exerted through said yielding rubber members.

5. A vibration dampener comprising a driving member and a driven member, said driven member including an inertia element, each of said members having interengaging friction surfaces through which said driven member is frictionally driven by said driving member, a yielding rubber power transmitting driving connection between said members, and a spring for retaining said members in frictional engagement under spring tension exerted through said yielding rubber power transmitting driving connection.

KURT A. BEIER.

REFERENCES CITED

The following references are of record in the file of this patent:

UNITED STATES PATENTS

| Number | Name | Date |
|---|---|---|
| 1,913,984 | Hann | June 13, 1933 |
| 1,925,073 | Gunn | Aug. 29, 1933 |

OTHER REFERENCES

Product Engineering, Oct. 1937, page 383.